United States Patent [19]

DeCecca

[11] Patent Number: 5,170,212
[45] Date of Patent: Dec. 8, 1992

[54] SELF-SEALING JOURNAL ASSEMBLY FOR A DEVELOPMENT APPARATUS

[75] Inventor: Michael L. DeCecca, Fairport, N.Y.

[73] Assignee: Eastman Kodak Company, Rochester, N.Y.

[21] Appl. No.: 740,229

[22] Filed: Aug. 5, 1991

[51] Int. Cl.⁵ .......................................... G03G 15/06
[52] U.S. Cl. ................................. 355/245; 118/653; 355/200; 384/420
[58] Field of Search .............. 384/135, 420, 144, 418, 384/419; 198/672, 673; 355/200, 245, 251, 259, 261, 215; 118/651, 653, 656, 661; 277/85, 96.1

[56] References Cited

U.S. PATENT DOCUMENTS

| | | | |
|---|---|---|---|
| 2,910,329 | 10/1959 | Runton | 384/420 |
| 3,343,891 | 9/1967 | Shipman | 277/55 |
| 4,026,564 | 5/1977 | Metcalfe | 277/96.1 |
| 4,167,321 | 9/1979 | Miyashita et al. | 355/200 |
| 4,277,114 | 7/1981 | Lindegger | 308/20 |
| 4,358,168 | 11/1982 | Kallin | 384/420 |
| 4,824,423 | 6/1989 | Bhagwat | 384/130 |
| 4,825,244 | 4/1989 | Hediger | 118/653 X |
| 4,923,312 | 5/1990 | Kamimura | 384/420 |
| 4,951,599 | 8/1990 | Damji | 118/657 |
| 5,023,660 | 6/1991 | Ebata et al. | 355/200 |

Primary Examiner—A. T. Grimley
Assistant Examiner—Robert Beatty
Attorney, Agent, or Firm—Tallam I. Nguti

[57] ABSTRACT

A self-sealing journal assembly for use with a load shaft of a development apparatus includes a bearing member, a sliding member that is keyed to a shaft member, and that is forced into contact with the bearing member by a plurality of deflectable cantilever spring fingers.

26 Claims, 7 Drawing Sheets

SELF-SEALING JOURNAL ASSEMBLY FOR A DEVELOPMENT APPARATUS

BACKGROUND OF THE INVENTION

Field of the Invention

The present invention relates to development apparatus for handling developer material particles in electrostatographic reproduction machines such as copiers and printers. More particularly, the present invention relates to a self-sealing journal assembly for use in such a development apparatus for preventing detrimental developer material particle leakage from such apparatus.

In electrostatographic reproduction machines such as copiers and printers, it is well known to use development apparatus which handle developer material particles for developing latent images formed therein. Typically such a development apparatus has a developer material particle transport auger for example that includes a rotatable load shaft. Directly or by means of an extension unit, such a load shaft usually extends from the inside of a housing for the development apparatus to the outside thereof, where it is journaled through a bore in a bearing.

In order for the journal bearing to function properly and reliably, some form of a clearance gap is normally required between the outside diameter of the journaled shaft and the inner surface of the bearing bore in order to allow radial and axial motion of the shaft. Unfortunately however, the presence of such a required clearance gap ordinarily results in leakage of some of the developer material particles into the bearing assembly where they can detrimentally affect the proper function of the journal bearing.

As disclosed for example in U.S. Pat. No. 4,824,423 issued Jun. 27, 1989 to Anil G. Bhagwat, various sealing mechanisms have been proposed for sealing around such a shaft so as to prevent leaking of developer material from the development apparatus housing, and in order to protect the shaft-to-bearing intersurface area against damage by leaking particles.

Unfortunately however, such proposed mechanisms utilize sealed rolling elements and/or compressible sealing elements such as felt or rubber. Sealed rolling elements ordinarily are relatively expensive, require lubrication, and do not normally allow for such axial compliance. Felt and rubber sealing materials on the other hand are ordinarily incapable of compensating for deviations in axial location between shaft and bearing surfaces. In addition, the use of such felt and rubber sealing materials often involves undesirable wear and friction requirements matching problems due to differences between shaft, seal and bearing materials. Furthermore seals made from such materials normally also tend to degrade with time, particularly in an environment such as that in which developer material consisting of toner and magnetic carrier particles is being handled.

SUMMARY OF THE INVENTION

It is therefore an object of the present invention to provide development apparatus including a self-sealing journal assembly that substantially prevents leaking of developer material from inside the development apparatus housing, and that effectively protects the shaft-to-bearing intersurface area thereto, thereby assuring a long-term and proper functioning of the assembly.

It is also an object of the present invention to provide a development apparatus that includes such a self-sealing journal assembly which has improved matching of wear and friction requirements between assembly component materials.

It is a further object of the present invention to provide for use in a development apparatus a self-sealing assembly that is simple, relatively inexpensive, and that effectively allows for proper rotary and axial motions of a load shaft of such a development apparatus.

In accordance with the present invention, a self-sealing journal assembly is provided which is useable in a development apparatus of an electrostatographic reproduction machine for preventing leakage of developer material from the inside of the development apparatus and damage thereto from any leaking developer material particles. The self-sealing assembly comprises a bearing member which has first and second ends, a bearing section, a bearing bore therethrough, a bearing wall surrounding the bearing bore, and a flange section that has an end surface at the second end of such bearing member. The self-sealing assembly also comprises a sliding member that has a sliding surface for mounting in sliding and sealing engagement against the end surface of the flange section of the bearing member, and a mounting aperture through such sliding member.

The self-sealing assembly further comprises a rotatable shaft member which has first and second ends, and which includes a first mounting portion for mounting rotatably through the bearing bore of the bearing member, and a second mounting portion for mounting sealingly through the mounting aperture of the sliding member. A plurality of generally radially extending cantilever spring fingers are formed on the shaft member for engaging and urging the sliding member into sealing contact with the end surface of the flange section of the bearing member.

BRIEF DESCRIPTION OF THE DRAWINGS

In the detailed description of the invention presented below, reference will be made to the drawings, in which.

DESCRIPTION OF THE PREFERRED EMBODIMENT

Because electrostatographic development apparatus are well known, the present description will be directed in particular only to development apparatus elements forming part of or cooperating more directly with the present invention. Other elements of a development apparatus not specifically shown or described herein are of course selectable from the prior art.

Figure 1:
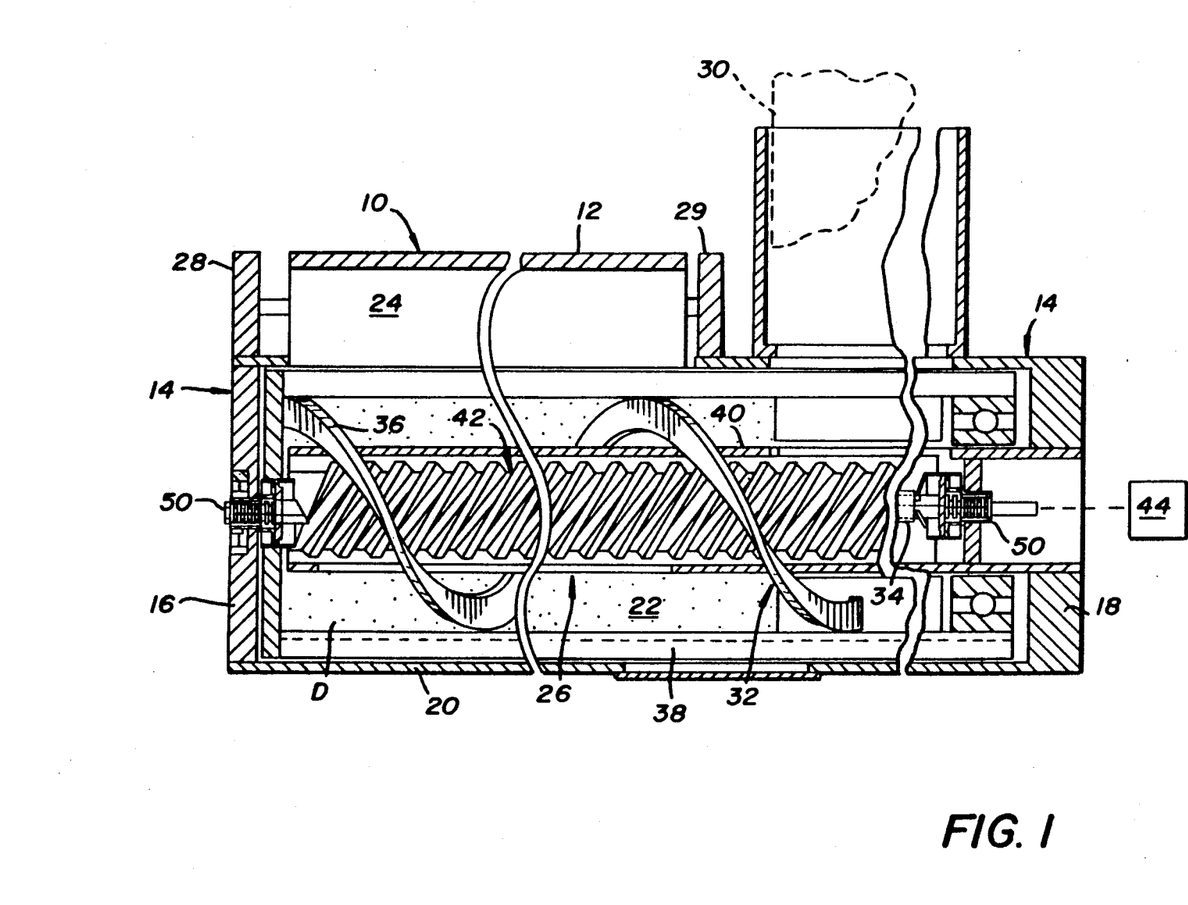
FIG. 1 is a fragmentary longitudinal section of the development apparatus of the present invention.

Referring now to FIG. 1 of the drawings, a development apparatus of the present invention is shown generally as 10 and is suitable for developing latent images formed electrostatically on an image bearing member 12, for example, of an electrostatographic reproduction apparatus (not shown). The development apparatus 10 comprises an elongate housing 14 which includes a front end wall 16, a back end wall 18, and a bottom wall 20. The development apparatus 10 further comprises a sump portion 22 within said housing 14 for holding a supply of developer material D which contains charged toner particles, as well as mixing and feeding means shown generally as 26 for charging and feeding the developer material D from the sump portion 22 to a development roller 24. The development roller 24 which can be a magnetic brush, is supported rotatably on supports 28, 29, and is moved to bring developer material D (fed thereto) into applying, or image development relationship with latent images on the bottom surface of the image bearing member 12 as illustrated. During such image development, charged toner particles are attracted to the latent images. Toner particles contained in the developer material D are therefore depleted due to such image development. Fresh toner particles therefore must be added or replenished for example from a cartridge container shown as 30.

As shown, the developer material mixing and feeding means 26 comprises a ribbon blender 32 which mounted about a rotatable load shaft 34 for moving and mixing developer material D within the housing 14. The ribbon blender 32 includes a developer material moving and mixing ribbon 36, and feed buckets 38 which are secured to the outer edge of the ribbon blender 32, and which rotate therewith to feed developer material from the sump 22 upwardly to the development roller 24. The feeding means 26 also comprises a toner particle supply device that includes a tube 40 and a helical auger 42 for moving fresh toner particles through the tube. The fresh toner particles are fed to the tube 40 from the container 30, and are then moved by the auger 42 for even distribution into the sump 22 for mixing therein. As shown, the mixing and feed means 26 can be driven by a common drive means 44 through the load shaft 34.

In accordance with the present invention, (a) in order to mount the mixing and feed means 26 to the end walls 16 and 18 as shown for proper functioning, and (b) in order to prevent detrimental developer material particle leakage from the housing 14, the development apparatus 10 further includes a self-sealing journal assembly shown generally as 50. As shown, the self-sealing journal assembly 50 is used for mounting each end of the load shaft 34 within the housing 14, and so a pair of the assembly 50 is shown. One assembly is mounted at the front end wall 16 and the other at the back end wall 18. As shown more fully in FIG. 2A and 2B, the load shaft 34 (shown in broken form) is mountable as such in the front and back end walls 16 and 18 respectively of the development apparatus 10.

Figure 2A:
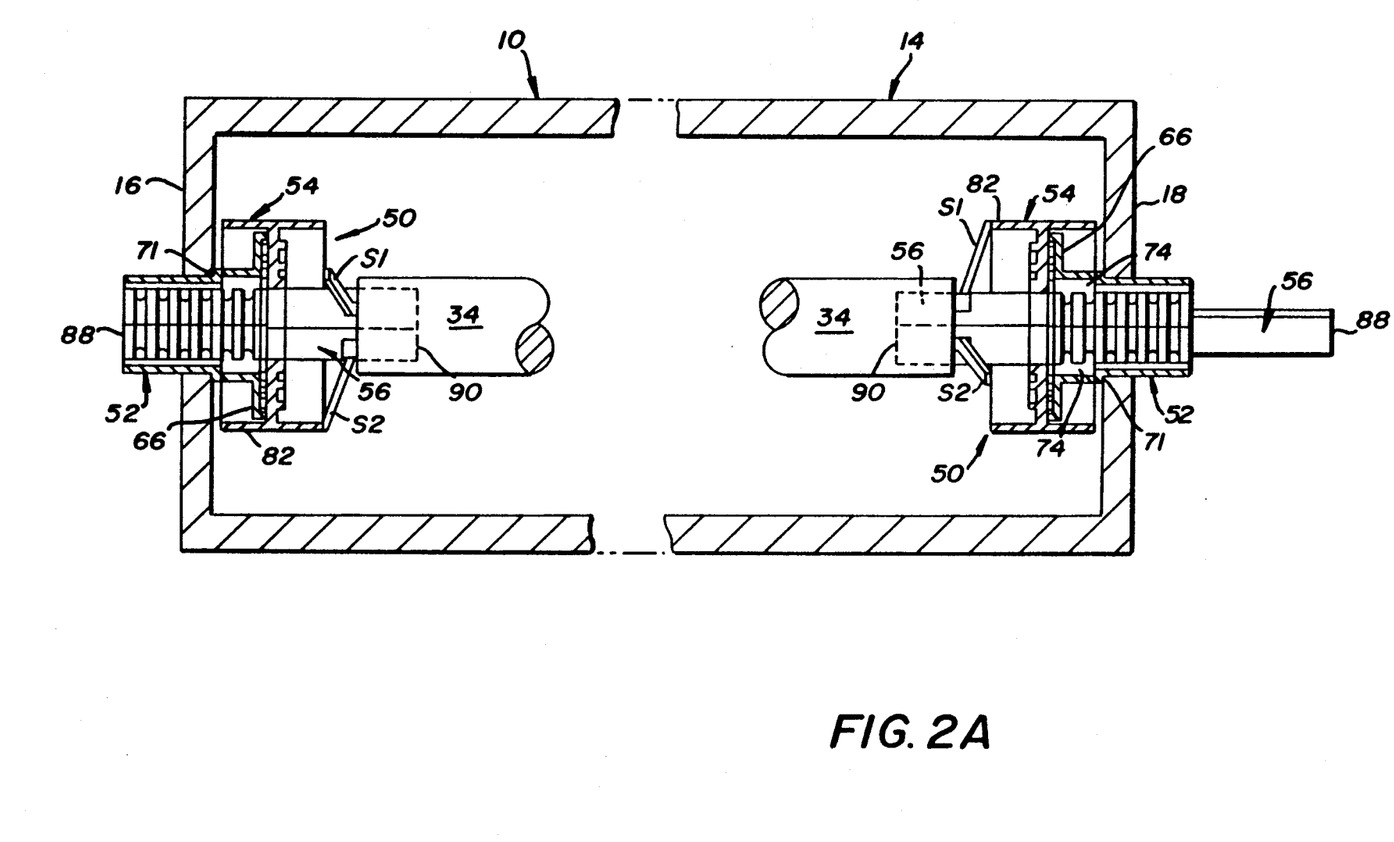
FIG. 2A is an enlarged partial section of the load shaft of the development apparatus of FIG. 1 including a self-sealing assembly of the present invention at each end.
Figure 2B:
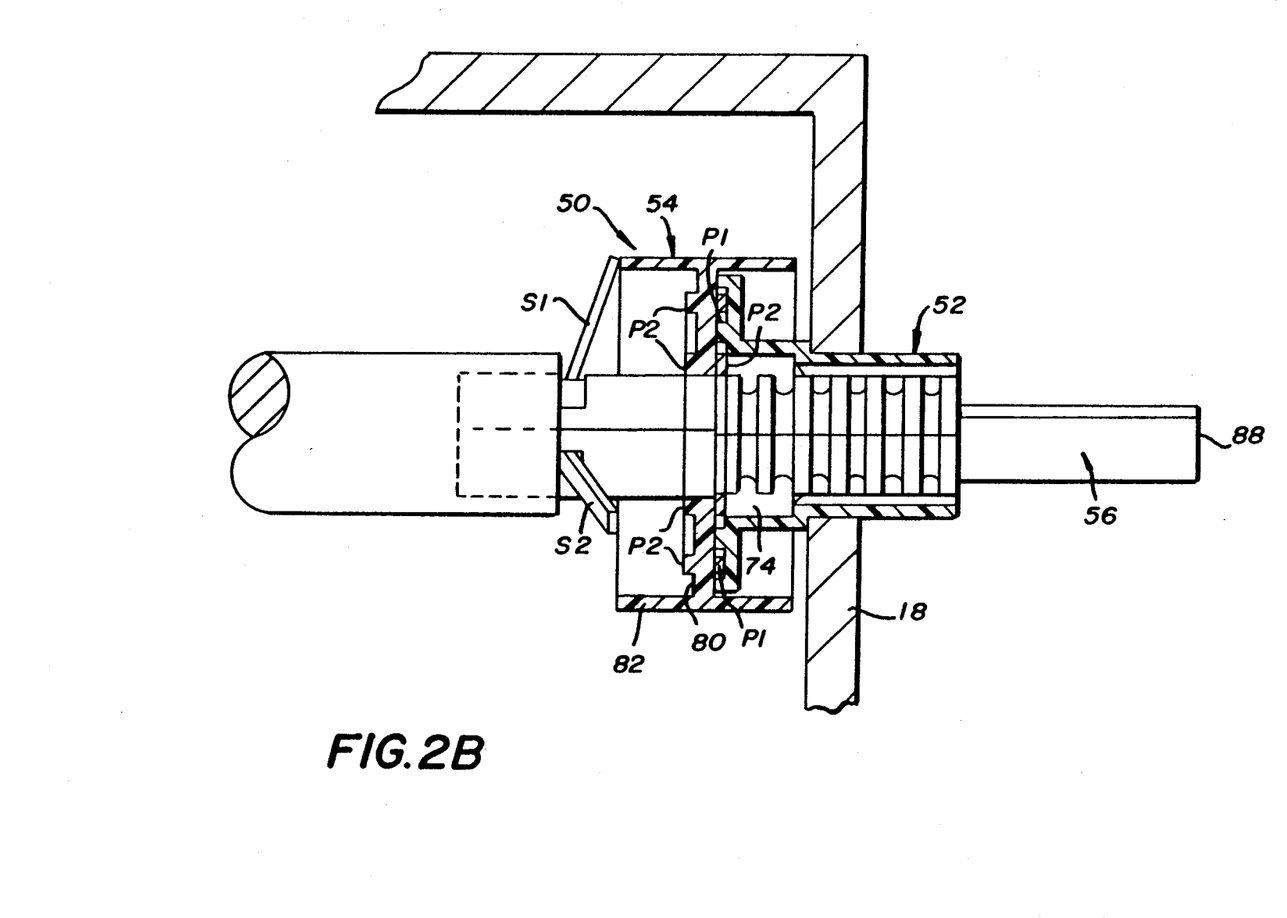
FIG. 2B is an enlarged view of the right end of FIG. 2A showing the labyrinth pattern of the bearing and sliding members of the present invention.
Figure 3A:
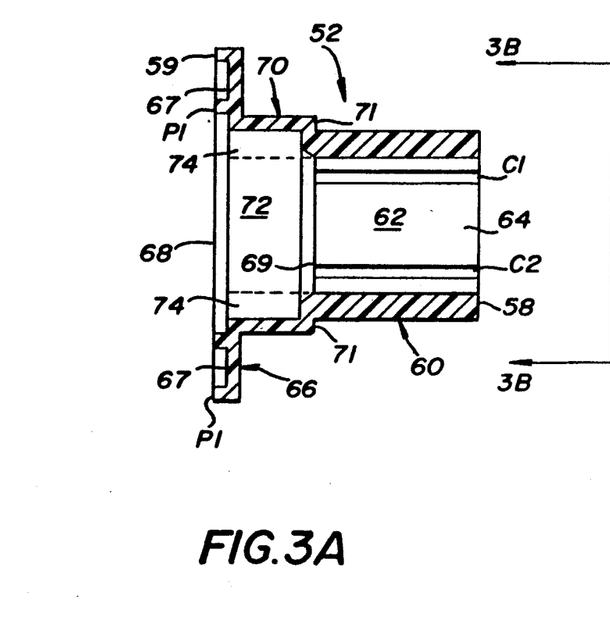
FIGS. 3A-3B illustrate details of the bearing member of FIGS. 2A, 2B with FIG. 3A being a side section and FIG. 3B being an end view in the direction 3B—3B of FIG. 3A.
Figure 3B:
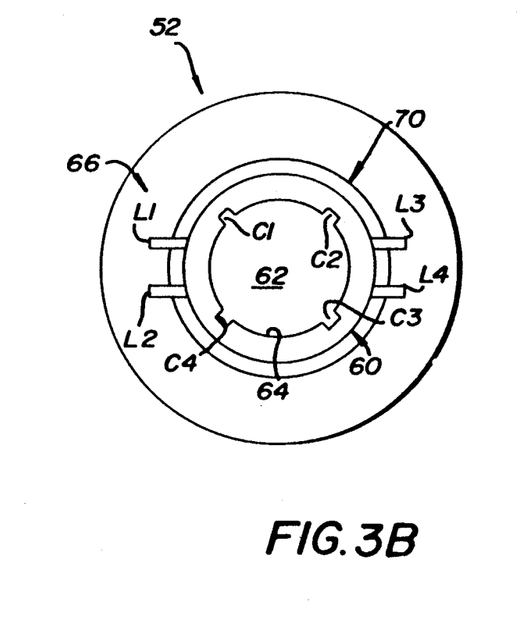

Referring now to FIGS. 2A-2B and, 3A-3B, the assembly 50 comprises a bearing member 52, a sliding member 54, and a shaft member 56. As shown in FIGS. 3A-3B., the bearing member 52 preferably is formed from a plastic material such as nylon, and includes a first end 58, a second end 59, and a bearing section 60. Bearing member 52 further includes a generally cylindrical bearing bore 62 therethrough the bearing section 60, a bearing wall 64 surrounding the bore 62, and a flange section 66 that is located towards the second end 59. The flange section 66 as shown has an end surface 67 and an aperture 68 therethrough. The end surface 67 includes a plural set of radially spaced and circumferentially extending ribs P1. Only a pair of such ribs are illustrated, but it is understood that a single rib, as well as a plurality of more than two ribs may be formed on the end surface 67.

The bearing wall 64 as shown includes a plurality of circumferentially spaced and axially extending channels shown for example as C1, C2, C3, and C4 which are formed therein for collecting leaking particles of developer material. The channels C1, C2 etc. are made sufficiently deep and sufficiently wide so as to allow discharging movement of collecting particles to, and through, the first end 58 of the bearing section 60. The bearing wall 64 also includes a chamfer 69 as shown at the end thereof which is away from the first end 58 of bearing member 52. The chamfer 69 is for allowing easy assembly of the shaft member 56 into the bearing section 60.

The bearing member 52 also includes an intermediate section 70 that is located between, and connected to, the bearing section 60 and flange section 66. As shown, intermediate section 70 has a cross-sectional dimension, for example an outer diameter (not labeled), that is greater than the outer diameter of the bearing section 60. As a consequence, the sections 60 and 70 connect as to form a shoulder step 71 which functions as a wall mounting stop (FIG. 2A). The intermediate section 70 further has an interior chamber 72 that communicates with the bearing bore 62 and the flange section aperture 68. Chamber 72 has a cross-sectional dimension, e.g. a diameter (not labeled) that as shown is significantly greater than the diameter of the bearing bore 62. This difference in bore and chamber diameter is such as to define a storage region 74 (FIGS. 2A, 2B and 3A) about a shaft portion which has substantially the same diameter as the bore 62, and which fits through the intermediate section 70.

Figure 6:
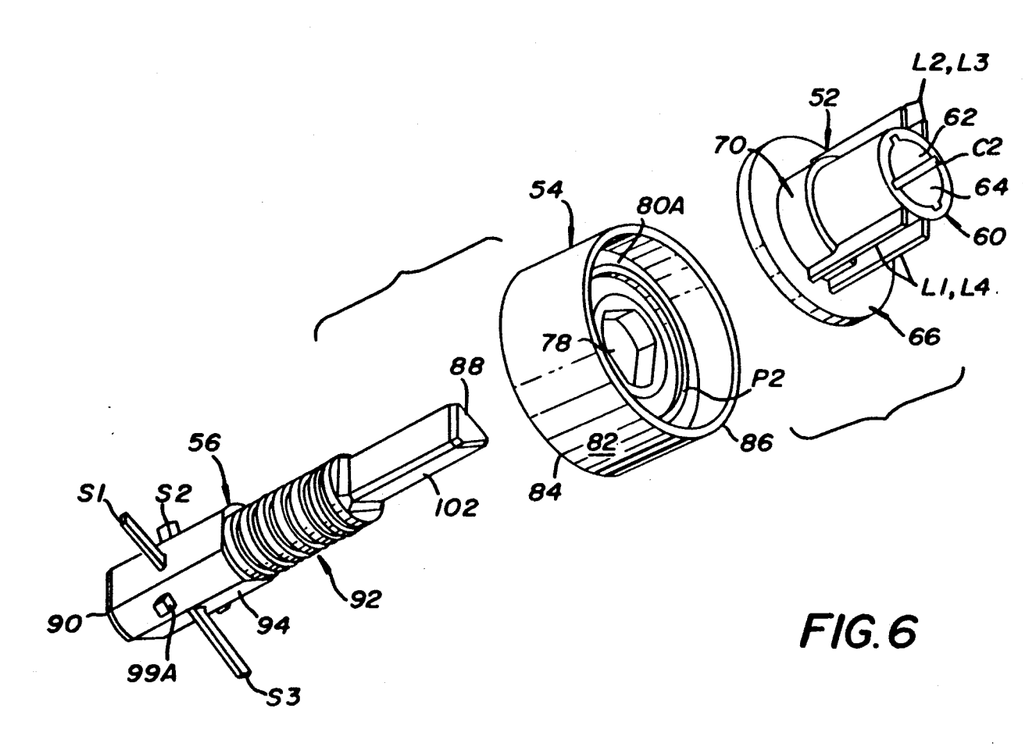
FIG. 6 is an exploded view of the shaft, sliding and bearing members of the self-sealing assembly of the present invention.

Referring in particular to FIGS. 3B and 6, the bearing member 52 further includes means, such as a plurality of radially extending and rigid fin-like key members L1, L2, L3, and L4 which are formed on the exterior surface of at least one or both of the bearing and intermediate sections 60 and 70. The key members L1-L4 are useful for mounting the bearing member 52 fixedly in an end wall, for example 16, of a development apparatus 10. The end walls include complementary slots or key ways for receiving the fin-like key members L1-L4. The members L1-L4 function as mounted to prevent the bearing member 52 from moving rotatably with respect to such end wall of the development apparatus when the shaft member 56 journaled through the bearing is being rotated.

Figure 4A:
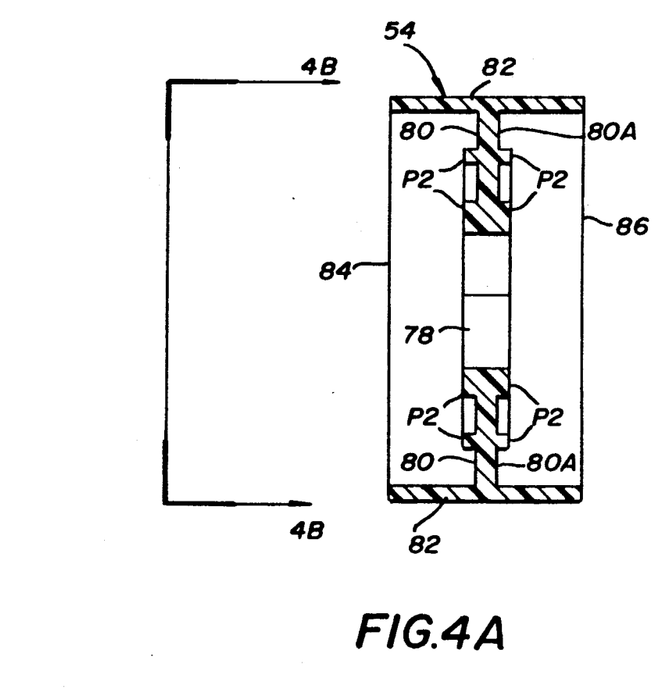
FIGS. 4A-4B illustrate details of the sliding member of FIGS. 2A, 2B with FIG. 4A being a side section and FIG. 4B an end view in the direction 4B—4B of FIG. 4A.
Figure 4B:
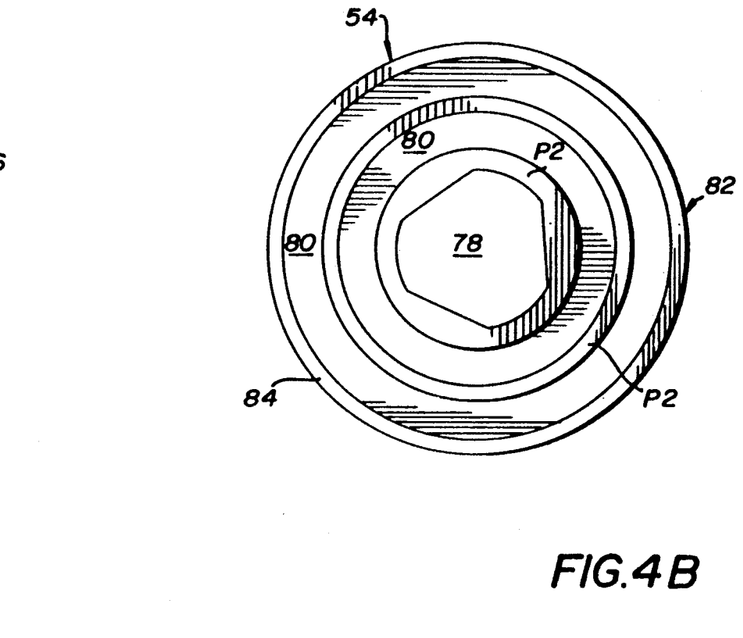

Referring now to FIGS. 4A and 4B, the sliding member 54 of the self-sealing journal assembly 50 is illustrated in detail. As shown, sliding member 54, which preferably is made of a plastic material such as acetal, includes a generally 3-sided polygonal mounting aperture 78 for mounting the sliding member 54 in a sealing manner to the shaft member 56, and a sliding surface, for example, the surface 80A (FIGS. 2A, 2B) for mounting in sliding and sealing engagement against the end surface 67 of the flange section 66 of bearing member 52. The sliding surface 80A includes a plural set of radially spaced and circumferentially extending ribs P2 formed thereon. As shown, the ribs P2 may be surrounded by a radially spaced cylindrical wall 82 that forms the external perimeter of the sliding member 54. The wall 82 has a front rim 86 facing the bearing member 52, and a rear rim 84 (FIG. 2B).

In order to allow easy assembly of the sliding member 54 as a part of the journal assembly 50, the member 54 is made to be symmetric and so includes an identical but alternative sliding surface 80 on the reverse face of the member 54 that includes the surface 80A. Sealing ribs P2 are also formed on the rear surface 80 facing towards the rear rim 84. As such, when the surface 80 is mounted against the end surface 67 of flange section 66, the rim 86 of sliding member 54 accordingly then is the rear rim of the member 54.

The diameter of the sliding surface 80, 80A of sliding member 54 is made significantly greater (FIG. 2A) than that of the end surface 67 of the flange section 66 with which it engages sealingly. The ribs P2 on the sliding surface 80, 80A, and those P1 on the end surface 67 are spaced radially so as to each make sealing engagement with the opposite surface (P1 with 80 or 80A, and P2 with 67) in a staggered and alternating pattern. The result is an interlocking sealing labyrinth of ribs P1 and P2. The spacing between adjacent P1 ribs, and P2 ribs should be such as to provide a desirable radial clearance gap or space following such interlocking. Such a clearance gap between each pair of interlocking ribs (FIG. 2B) is useful for accumulating any developer material particles that leak through the sealing contact between the shaft member and mounting aperture 78. As shown, the mounting aperture 78 is shaped so as to correspond to the shape of its mounting portion on the shaft member 56. As such the sliding member 54 can be mounted thereto simply by keying. Additionally, the aperture 78 is shaped so as to prevent any rotational movement of the sliding member 54 relative to the shaft member 56, but such that it allows axial translation of the sliding member 54 relative to such shaft member 56.

Referring now to FIGS. 2A, 2B and 5A-5C, the shaft member 56 of the present invention is illustrated as a shaft extension member that includes means for coupling it to the load shaft 34. As can be appreciated, the member 56 can also be an integral end portion for example of the load shaft 34. The shaft member 56 as shown (FIG. 5A) is a rotatable and elongate member that has a first end 88 and a second end 90. Shaft member 56 is made for example of a plastic material such as acetal, and includes a first mounting portion 92 for mounting rotatably through the aperture 68 of flange section 66, through the chamber 72 of intermediate section 70, and through the bearing bore 62 of the bearing section 60 of bearing member 52. Shaft member 56 also includes a second mounting portion 94 for mounting in a sealing manner through the mounting aperture 78 of sliding member 54. As further shown, the shaft member 56 includes a plurality of cantilever spring fingers S1, S2, and S3 which are formed of the same material (acetal) as, and integrally with, the shaft member 56. The spring fingers S1-S3 extend in a generally radial direction relative to the axis of shaft member 56. As shown in FIGS. 1 and 2, the spring fingers S1, S2, and S3 are useful for engaging and axially urging the sliding member 54 into sealing engagement with the end surface 67 of the flange section 66.

The first mounting portion 92 as shown is generally cylindrical and has an outer diameter (not labeled) which is substantially equal to the inside diameter of the bearing wall 64 of bearing member 52. First mounting portion 92 further includes a plurality of axially spaced and circumferentially extending grooves 96 which are recessed from contact with the bearing wall 64 when mounted therein as shown in FIG. 2A and 2B. The grooves 96 serve to collect any developer material particles, which have leaked that far, away from the interface or contact surface area between the shaft member 56 and the bearing wall 64. As formed, the grooves 96 will lie transversely to the axially extending channels C1, C2, C3, and C4 in the bearing wall 64 through which mounting portion 92 is assembled. Leaking developer material particles collecting in the grooves 96 thus will subsequently collect into the channels C1-C4 for eventual discharge from the assembly 50. As such, the bearing surface of the assembly is protected and proper long term functioning of the rotatable shaft member 56 is assured.

Figure 5A:
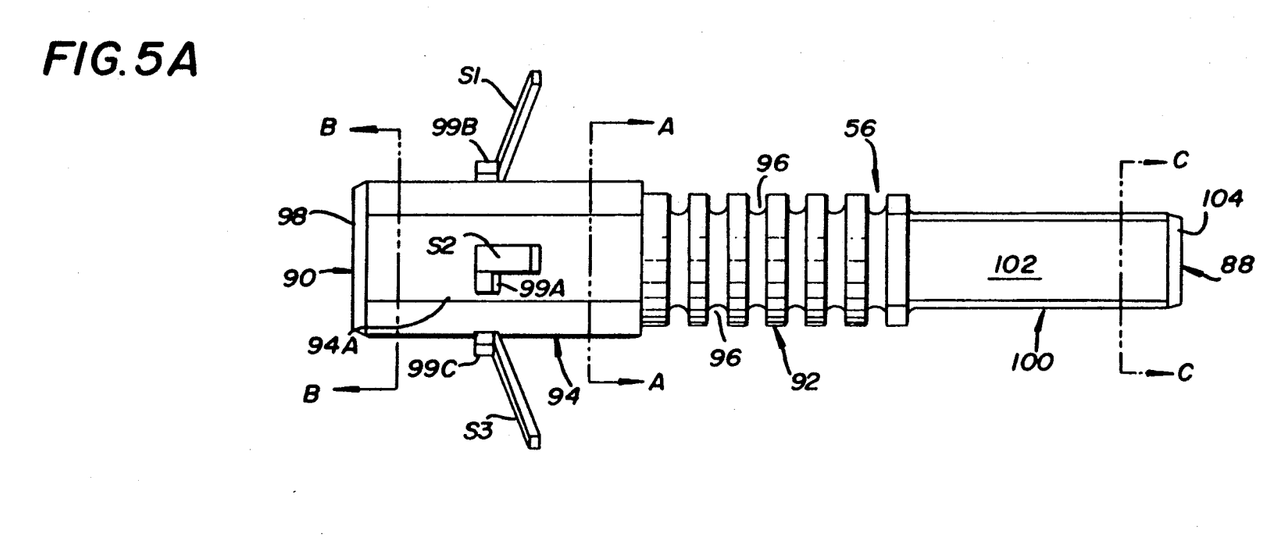
FIGS. 5A-5C illustrate details of the shaft member of the self sealing assembly of FIG. 3.
Figure 5B:
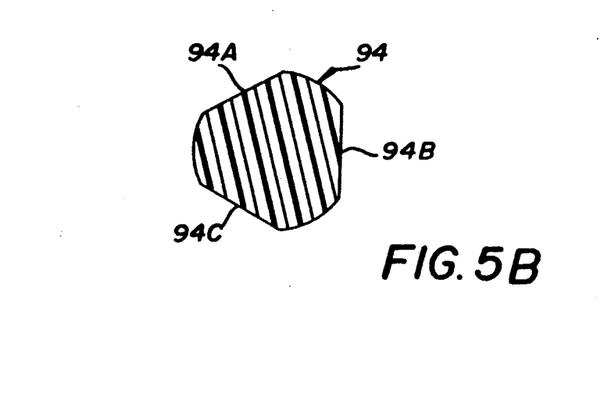

The second mounting portion 94 as shown in FIG. 5B is made so as to be mountable merely by keying it through the mounting aperture 78 of sliding member 54. The cross-sectional shape and dimensions of the portion 94 are therefore such as would allow it to sit in a keying and sealing manner through the aperture 78. Accordingly the portion 94 has a generally 3-sided polygonal cross-section with sides 94A, 94B, 94C for fitting the aperture 78 so as to prevent the leaking of developer material particles therethrough. The dimensions of the portion 94 as such are selected so as to prevent such leaking and any rotation of sliding member 54 relative to the shaft member 56. The member 54 is therefore forced to rotate with the shaft member 56. The sealing effect of the sides 94A, 94B, and 94C against the walls of the aperture 78 should substantially prevent developer material particles which are attempting to leak therethrough (left to right direction FIG. 4A) from reaching the bearing wall 64 as mounted about the cylindrical portion 92 of shaft member 56.

Additionally, however, the dimensions of the sides 94A-94C should be such as to allow some axial translation of the sliding member 54 relative to the shaft member 56. Such axial translation advantageously allows the sliding surface 80, 80A of the member 54 to be urged effectively against the end surface 67 of the fixedly mounted bearing member 52. The sliding member 54 is urged as such by means of the cantilever spring fingers S1, S2, and S3 which each externally resiliently engages the rear rim, for example 84, (FIG. 2A, 2B) of the sliding member 54. Such external engagement allows each finger to deflect off such rim when the shaft member 56 is urged axially outwards as for example by the load shaft 34. In the development apparatus 10, such deflection of the spring fingers S1-S3 effectively compensates for any axial out-of-tolerance conditions in the mounting and operation of the self-sealing journal assembly 50.

Still referring to FIGS. 2A, 2B and 5A-5C, the shaft member 56 includes means (at the second end 90), including a chamfer 98, for coupling the self-sealing journal assembly 50 to a load shaft such as 34. For ease of manufacture and assembly, the second end 90 of shaft member 56 may be made so as to have the same cross-sectional shape and dimensions as the second mounting portion 94 thereof. As such the shaft member 56 can be coupled to the load shaft 34 through a matching aperture therein simply by keying it thereto so that relative rotation is prevented. Torque is thus transmitted from the sides 94A-94C to the load shaft 34. To prevent overtravel of the coupled load shaft 34 into damaging contact with spring fingers S1, S2, S3, the shaft member 56 further includes on second mounting portion 94 a plurality of rigid stop members 99A, 99B and 99C which are located between the spring fingers S1-S3 and the second end 90. As shown, the stop members 99A-99C can be relatively short rigid and radially extending fingers formed integrally with the shaft member 56 on respective surfaces 94A-94C.

Figure 5C:
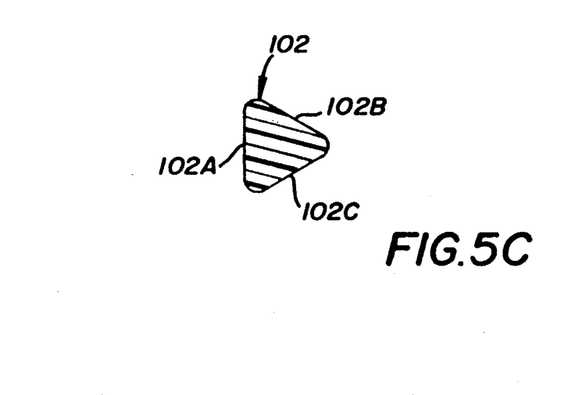

Referring now to FIGS. 1, 2A-2B and 5A, where the self-sealing journal assembly 50 is to be used at the drive end of a development apparatus 10, the shaft member 56 thereof additionally should have means 100 (FIG. 5A) for coupling to a drive source, for example 44 (FIG. 1). The means 100 as shown includes a third mounting portion 102 and an end chamfer 104 at the first end 88. As shown in FIG. 5C, the third mounting portion 102 may be made to have a generally triangular cross-section with input torque receiving sides 102A, 102B, and 102C for keying through a corresponding mating aperture in a drive shaft of the source 44.

Referring now to FIGS. 1, 2A, 2B, and 6, the self-sealing journal assembly 50 is put together by first inserting the first end 88 of shaft member 56 through the mounting aperture 78 of sliding member 54. The sliding member 54 is then brought axially towards, and in a keying engagement over the second mounting portion 94 of shaft member 56, and until the spring fingers S1, S2, S3 thereof engage the rear rim, for example, 84 of the external wall 82 of the sliding member 54. Next the first end 88 is then inserted through the aperture 68 (FIG. 3A) of the flange section 66 of the bearing member 52 towards, and through the bearing bore 62 of the bearing section 60. The bearing member 52 is then brought axially towards the already mounted sliding member 54 until the end surface 67 of flange section 66 engages the ribs P2 on the opposing sliding surface, for example surface 80A of sliding member 54 and the bearing wall 64 of the bearing section 60 thereof is in engagement with the first mounting portion 92 of shaft member 56. As shown in FIG. 2A, 2B where the assembly 50 is to be coupled to a drive source 44, the third mounting portion 102 of the first end 88 of shaft member 56 should then project beyond the first end 58 (FIG. 3A) of bearing member 52.

The entire assembly can then be mounted to an end wall, for example end wall 18 FIG. 2A, 2B, of a development apparatus 10 by inserting the bearing section 60 of bearing member 52 from the inside towards the outside of such end wall 18. The end wall 18 should have corresponding slots (not shown) therein for receiving the anti-rotational locking means L1, L2, L3, L4 (FIG. 3B) of bearing member 52. The aperture in such wall for receiving the bearing section 60 should be such as to create a snug and sealing fit of such section 60 therethrough. As a result, the section 60 should be inserted therethrough until the shoulder step 71 between the bearing section 60 and the intermediate section 70, for example, catches against the inside surface of the wall 18. In the present invention where the sliding surface 80A is recessed with respect to the wall 82 of sliding member 54, the front rim of the wall 82, for example the rim 84, could substantially be in a sealing engagement against the inside of such wall 18 when the step 71 catches against such wall 18. Because the surface 80 is similarly recessed from the rear rim 86 as mounted, developer material could unnecessarily accumulate in such recess between the rim 86 and surface 80. To prevent such unnecessary accumulation a compliant filler-material such as a piece of foam material (not shown) can be added as conventional packing between the surface 80 and the base of the cantilevered spring fingers 99A, 99B, 99C. The piece of foam material will, of course, include a mounting aperture similar but smaller than the aperture 78 of sliding member 54 for mounting to the shaft member 56.

Were it not for the recessed nature of the surface 80, 80A of the member 54 relative to the wall 82, the receiving aperture in the wall 18 can, of course, be such as to allow the insertion therethrough of both the bearing section 60 and the intermediate section 70. It should be noted that the bearing member 52 can instead be separately mounted to the wall 18, and that a partial assembly of the shaft member 56 and sliding member 54 can then be inserted into such bearing member 52 as mounted.

As mounted in the wall 18, the assembly 50 is thus ready for coupling to a load shaft such as 34, and to a drive source for example 44 at a drive end of the development apparatus 10. The assembly 50 at the drive end should of course be aligned as carefully as possible with the assembly 50 at the other end. Additionally, the axial distance between the second end 90 of each shaft member 56 of each of the two assemblies 50 (as mounted) should be slightly less than the coupled length of the load shaft 34. As such, the coupling thereto of the load shaft 34 should cause the partial assembly of shaft member 56 and sliding member 54 to move outwardly into the bearing member 52 of each assembly 50 in order to accommodate the greater coupled length of the load shaft 34. The coupled length of the load shaft 34 as used herein is that portion of the load shaft that lies axially between the very external tips of the ends 90 of the assemblies 50 as coupled thereto.

During such outward movement of the partial assemblies of members 54, 56 into 52, the spring fingers S1, S2, S3 of shaft member 56 are deflected in order to compensate for any axial out-of-tolerance condition, and the ribs P2 of the sliding member 54 are pressed firmly into engagement with the end surface 67 of the flange section 66 of bearing member 52. At the same time the ribs P1 of the end surface 67 are pressed equally and oppositely into firm engagement with the sliding surface 80, 80A of sliding member 54 within the space between the ribs P2 thereon. The space between adjacent P1 ribs, and P2 ribs should be made wider than the thickness of the opposite rib fitting therein for forming the labyrinth thereof. This is in order to allow for possible radial misalignment of the sliding surface 80, 80A and end surface 67, as well as in order to provide room therein for collection and accumulation of any developer particles leaking from inside the development apparatus housing 14.

As can be seen, the self sealing journal assembly 50 of the present invention involves no use of conventional sealing materials such as felt and rubber which deteriorate easily with use, which are incapable of compensating for axial deviations, and which present wear and friction requirement matching problems. The assembly 50 also involves no relatively expensive rolling element bearing members which as known require lubrication and are ordinarily incapable of allowing for axial compliance. The shaft member 56, sliding member 54 and bearing member 52 are easy to assemble. The sliding member 54 and shaft member 56 are made of the same material (acetal) for wear and friction compatibility. The axial translation of the sliding member 54 and the action of the integrally formed spring fingers S1-S3 allow for significant and advantageous axial compliance of the assembly 50. The matching surfaces provide significant sealing against developer material particle leakage, yet they also allow significant clearance for appropriate rotational and axial movement of the shaft member 56, thereby assuring proper functioning of such a journal assembly.

The radial spacing in the labyrinth created by the interlocking of sealing ribs P1 and P2, the storage regions 74 of intermediate section 70, and the interaction of the grooves 96 of the first mounting portion 92 of shaft member 56 with the channels C1-C4 of bearing wall 64 additionally function to collect, accumulate, and/or discharge any leaking developer materials particles away from the interface between the bearing wall 64 and mounting portion 92. The result of course is assured advantageous long-term proper functioning of the journal assembly 50.

Another advantage of the sealing assembly 50 as mounted in the development apparatus 10 is effective unclumping of the developer material D being handled therein. Such unclumping is provided by the rotational movement of the spring fingers S1-S3 and of the stop members 99A-99C through such developer material D within the ends of the apparatus 10.

The invention has been described in detail with particular reference to a presently preferred embodiment, but it will be understood that variations and modifications can be effected within the spirit and scope of the invention.

What is claimed is:

1. A self-sealing assembly for use in an electrostatographic reproduction apparatus, the self-sealing assembly comprising:
   (a) a bearing member having first and second ends, a bearing section, a generally cylindrical bearing bore through said bearing section, a bearing wall surrounding said bearing bore, said bearing wall including a plurality of axially extending channels therein, and a flange section having an end surface at said second end thereof;
   (b) a sliding member having a sliding surface for mounting in sealing and sliding engagement against said end surface of said flange section, and a mounting aperture through said sliding member; and
   (c) an elongate shaft member having a first end, and a second end, said shaft member including a first mounting portion for mounting rotatably through said bearing bore of said bearing member, a second mounting portion for mounting sealingly through said mounting aperture of said sliding member, and a plurality of substantially radially extending cantilever spring fingers for resiliently urging said sliding member into sealing engagement with said flange section of said bearing member.

2. A self-sealing assembly for use in an electrostatographic reproduction apparatus, the self-sealing assembly comprising:
   (a) a bearing member having a bearing section with a generally cylindrical bearing bore through said bearing section, a bearing wall surrounding said bearing bore, and a flange section having an end surface surrounding said bearing bore, said end surface including a plural set p1 of radially spaced ribs;
   (b) a sliding member having a sliding surface rotating in sealing and sliding engagement against said end surface of said flange section, and a mounting aperture through said sliding member; and
   (c) an elongate shaft member having a first end and a second end, said shaft member including a first mounting portion mounted rotatably through said bearing bore of said bearing member, a second mounting portion mounted sealingly through said mounting aperture of said sliding member, and a substantially radially extending cantilever spring member for resiliently urging said sliding member into sealing engagement with said flange section of said bearing member.

3. A self-sealing assembly of claim 2 wherein said bearing member includes an intermediate section connected to said bearing wall and to said flange section, and said intermediate section having a chamfer therein communicating with said bearing bore.

4. The self-sealing assembly of claim 2 wherein said bearing wall of said bearing member includes a plurality of circumferentially spaced and axially extending channels therein suitable for collecting leaking particles.

5. The self-sealing assembly of claim 2 wherein each rib of said plural set P1 of radially spaced ribs extends circumferentially on said end surface.

6. The self-sealing assembly of claim 2 wherein said sliding surface of said sliding member includes a plural set P2 of radially spaced and circumferentially extending ribs thereon.

7. The self-sealing assembly of claim 2 wherein said first end of said shaft member includes means for coupling to a drive shaft.

8. The self-sealing assembly of claim 2 wherein said first mounting portion of said shaft member for mounting rotatably through said bearing wall is generally cylindrical and has an outer diameter substantially equal to an inside diameter of said bearing wall of said bearing member.

9. The self-sealing assembly of claim 2 wherein said mounting aperture of said sliding member and said second mounting portion for mounting sealingly through said mounting aperture have generally complementary shapes.

10. The self-sealing assembly of claim 2 including a plurality of cantilever spring members.

11. The self-sealing assembly of claim 2 wherein said cantilever spring member externally engages the outer rim portion of a face of said sliding member.

12. The self-sealing assembly of claim 2 wherein said bearing member includes means for mounting said bearing member fixedly in a wall of a development apparatus housing.

13. The self-sealing assembly of claim 2 wherein said sliding member and said shaft member are made from the same material.

14. The self-sealing assembly of claim 2 wherein said shaft member is a load shaft extension member including means at said second end thereof for coupling to a load shaft of a development apparatus.

15. The self-sealing assembly of claim 2 wherein said sliding member is symmetric including a second and opposite sliding surface suitable for similarly mounting with respect to said flange section of said bearing member thereby increasing the flexibility of assembly thereof.

16. The self-sealing assembly of claim 3 wherein said intermediate section has a cross-sectional dimension greater than that of said bearing section thereby defining a shoulder step portion and acting as a stop against a mounting wall of a development apparatus.

17. The self-sealing assembly of claim 4 wherein said axially extending channels are shaped so as to allow discharge of particles collecting therein to and through a first end of said bearing member.

18. The self-sealing assembly of claim 6 wherein the diameter of said sliding surface of said sliding member is greater than that of said flange section of said bearing member.

19. The self-sealing assembly of claim 8 wherein said first mounting portion of said shaft member includes a plurality of axially spaced circumferentially extending grooves formed therein for protecting said bearing wall of said bearing section by collecting any leaking particles within said bearing section away from said bearing wall.

20. The self-sealing assembly of claim 9 wherein said sliding member is keyed such as to prevent any rotation thereof relative to said shaft member, but such as to allow axial translation thereof relative to said shaft member.

21. The self-sealing assembly of claim 10 wherein axial deflection of said spring members effectively compensates for axial out-of-tolerance conditions with a load shaft of a development apparatus.

22. The self-sealing assembly of claim 13 wherein said shaft member and said sliding member are made from a plastic material.

23. The self-sealing assembly of claim 13 wherein said bearing member is made of nylon.

24. The self-sealing assembly of claim 14 including a plurality of stopping means located between said spring members and said load shaft coupling means for preventing detrimental over travel of the load shaft into damaging contact with said spring fingers.

25. The self-sealing assembly of claim 18 wherein said ribs P2 on said sliding surface are spaced so as to each make sealing contact with said end surface of said flange section between a staggered set of cooperating ribs P1 on said end surface of said flange section.

26. A development apparatus for use in an electrostatographic reproduction machine including an image-bearing member, the development apparatus comprising:

(a) a housing including a sump portion;

(b) a development roller located in said housing so as to be adjacent the image-bearing member of the reproduction machine for moving charged developer material into applying relationship with electrostatic latent images on such image-bearing member;

(c) feed means between said sump portion and said development roller for feeding charged developer material from said sump portion to said development roller;

(d) a developer material mixing device located in said sump portion of said housing, said mixing device including a rotatable load shaft; and (e) a self-sealing journal assembly in the development apparatus for blocking detrimental leakage of developer material from the inside of such development apparatus, the self-sealing assembly comprising:

(i) a bearing member having first and second ends, a bearing section, a generally cylindrical bearing bore therethrough, a bearing wall surrounding said bearing bore, and a flange section having an end surface at said second end thereof;

(ii) a sliding member having a sliding surface mounted in sealing and sliding engagement against said end surface of said flange section, and a mounting aperture through said sliding member., and (iii) a rotatable shaft extension member having a first end for coupling to a drive means, and a second end for coupling to said rotatable load shaft of said mixing device, said shaft extension member including a first mounting portion mounted rotatably through said bearing bore of said bearing member, a second mounting portion mounted sealingly through said mounting aperture of said sliding member, and a plurality of substantially radially extending cantilever spring fingers resiliently urging said sliding member into sealing engagement with said end surface of said flange section of said bearing member.

* * * * *